United States Patent [19]

Banse

[11] Patent Number: 5,056,492
[45] Date of Patent: Oct. 15, 1991

[54] FUEL TANK

[75] Inventor: Permjit S. Banse, Billericay, Great Britain

[73] Assignee: Ford Motor Company, Dearborn, Mich.

[21] Appl. No.: 565,291

[22] Filed: Aug. 9, 1990

[30] Foreign Application Priority Data

Aug. 11, 1989 [GB] United Kingdom ................. 8918362

[51] Int. Cl.⁵ ............................................ F02M 37/04
[52] U.S. Cl. .................................... 123/509; 123/514; 137/565; 137/592
[58] Field of Search ....................... 123/509, 514, 510; 417/360; 137/565, 590, 592; 220/905, 562, 564

[56] References Cited

U.S. PATENT DOCUMENTS

| 3,470,907 | 10/1969 | Shockey | 137/590 |
|---|---|---|---|
| 4,304,530 | 12/1981 | Gens | 417/360 |
| 4,305,416 | 12/1981 | Henning et al. | 137/590 |
| 4,462,620 | 7/1984 | Bambenek et al. | |
| 4,546,750 | 10/1985 | Brunell et al. | 123/514 |
| 4,590,964 | 5/1986 | Beardmore | 137/565 |
| 4,651,701 | 3/1987 | Weaver | 137/590 |
| 4,672,937 | 7/1987 | Fales et al. | 123/514 |
| 4,694,857 | 11/1987 | Harris | 417/360 |
| 4,706,707 | 11/1987 | Betterton et al. | 137/565 |
| 4,722,708 | 2/1988 | Baltz | 123/514 |
| 4,747,388 | 5/1988 | Tuckey | 123/514 |
| 4,750,518 | 6/1988 | Griffin et al. | 137/590 |
| 4,780,063 | 10/1988 | Tuckey | 137/590 |
| 4,790,185 | 12/1988 | Fedelem et al. | 137/565 |
| 4,798,522 | 1/1989 | Kaga et al. | 137/565 |
| 4,869,225 | 9/1989 | Nagata et al. | 137/592 |
| 4,945,884 | 8/1990 | Coha et al. | 123/509 |

FOREIGN PATENT DOCUMENTS

| 120343 | 3/1984 | European Pat. Off. . |
|---|---|---|
| 2440904 | 11/1976 | Fed. Rep. of Germany . |
| 2550950 | 5/1977 | Fed. Rep. of Germany . |
| 3320492 | 12/1984 | Fed. Rep. of Germany . |
| 2489760 | 3/1982 | France . |
| 583306 | 12/1946 | United Kingdom . |
| 1520742 | 8/1978 | United Kingdom . |

Primary Examiner—E. Rollins Cross
Assistant Examiner—Thomas N. Moulis
Attorney, Agent, or Firm—Damian Porcari; Roger L. May

[57] ABSTRACT

A fuel tank closure component supporting a fuel pump, a fuel level sensor, and fuel line connections to the vehicle engine. The closure component fits into a circular aperture in the top of the tank. The closure component has a metal plate and a plastic connector body. The connector body has two push-fit sockets for receiving the ends of fuel line connections and a socket for receiving an outlet of the fuel pump.

1 Claim, 5 Drawing Sheets

FUEL TANK

FIELD OF THE INVENTION

This invention relates to a fuel tank, to a fuel tank closure component for completing the fuel tank, and to an in-tank fuel pump assembly.

BACKGROUND OF THE INVENTION

Fuel tanks for motor vehicles are conventionally manufactured as an enclosure with a filler neck extending from the enclosure and with an opening in an upper surface through which internal fuel tank components such as a fuel level sender unit and a fuel pump can be introduced into the tank. A closure component is required to close this opening once the internal components have been introduced, and also to provide passages through which fuel can flow to and from the engine. This closure component is also used for mounting the fuel pump when the pump is placed inside the tank, and this type of pump is referred to as an 'in-tank' pump.

It is important that this closure component should be capable of sealing tightly with the surrounding material of the fuel tank. It is known to make the closure component of metal and to fit one or two fuel pipes through the metal disk and to support them and seal them in the disk by means of soldering and by internal bracketry. Separate flexible tubes are then fitted to connect the fuel pipe to an in-tank pump. Tank assemblies of this form are used, for example, in the Ford Sierra vehicle marketed in the United Kingdom by Ford Motor Company Limited in 1989. Such assemblies are, however, complicated to manufacture, requiring several assembly operations.

SUMMARY OF THE INVENTION

According to the present invention, there is provided a fuel tank comprising a tank body having top, bottom and side walls defining an internal cavity for containing fuel, a fuel filler pipe communicating with the cavity, an opening in the top wall of the tank body and a closure component received in the opening to close the opening, the closure component comprising a metal plate with an aperture therethrough and a molded plastic connector body received in the aperture, the connector body including at least one push-fit socket for receiving a fuel outlet pipe.

The tank may be a steel tank or a blow-molded plastic tank.

The invention also provides a fuel tank closure component comprising a metal plate adapted to fit into an opening in a fuel tank and having a central aperture, and a molded plastic connector body received in the aperture, the connector body including at least one push-fit socket for receiving a fuel outlet pipe.

Push-fit sockets for use in fuel lines are known, and an example of such a socket is described in GB-PS 1,520,742. The main characteristic of such a push-fit socket is that the act of pushing a pipe completely into the socket completes a fluid tight joint between the tube and the socket and brings into action a mechanical lock preventing the pipe being withdrawn from the socket.

There will normally be sockets for two fuel pipes, one for the fuel flow to the engine and the other for the fuel return from the engine.

The mouths of the sockets into which the fuel pipes will be pushed are preferably substantially flush with the outer surface of the component and, in use, substantially flush with the outer surface of the fuel tank.

The metal plate is preferably a mild steel disc with a circular aperture, and the plastic molding is received in the aperture. A rubber seal may be fitted between the plastic molding and the metal plate.

The metal plate preferably supports the fuel pump and the sender assembly. Where the tank is of plastic, a securing ring arrangement comprising a ring molded into the periphery of the opening and a separate retaining ring may be used to secure the component.

In an alternative form, the connector body may be simply staked into an aperture in the metal plate.

A further aspect of the invention provides an in-tank fuel pump assembly comprising a pump having a pump outlet, a connector body having a passage therethrough for fuel feed to an engine and a closure component for securing in a wall of a fuel tank to close an opening in the wall after insertion of the pump, wherein the connector body is mounted in the closure component with the pump outlet connected directly into one end of the component and the other end of the component having a socket on the opposite side of the component for receiving the end of a fuel pipe, and wherein the fuel pump is secured to the closure component by a bracket.

There may be two fuel passages through the connector body, and a fuel level sensor may also be secured to the bracket, in addition to the pump.

BRIEF DESCRIPTION OF THE DRAWINGS

The invention will now be further described, by way of example, with reference to the accompanying drawings, in which.

DESCRIPTION OF A PREFERRED EMBODIMENT

Figure 1:
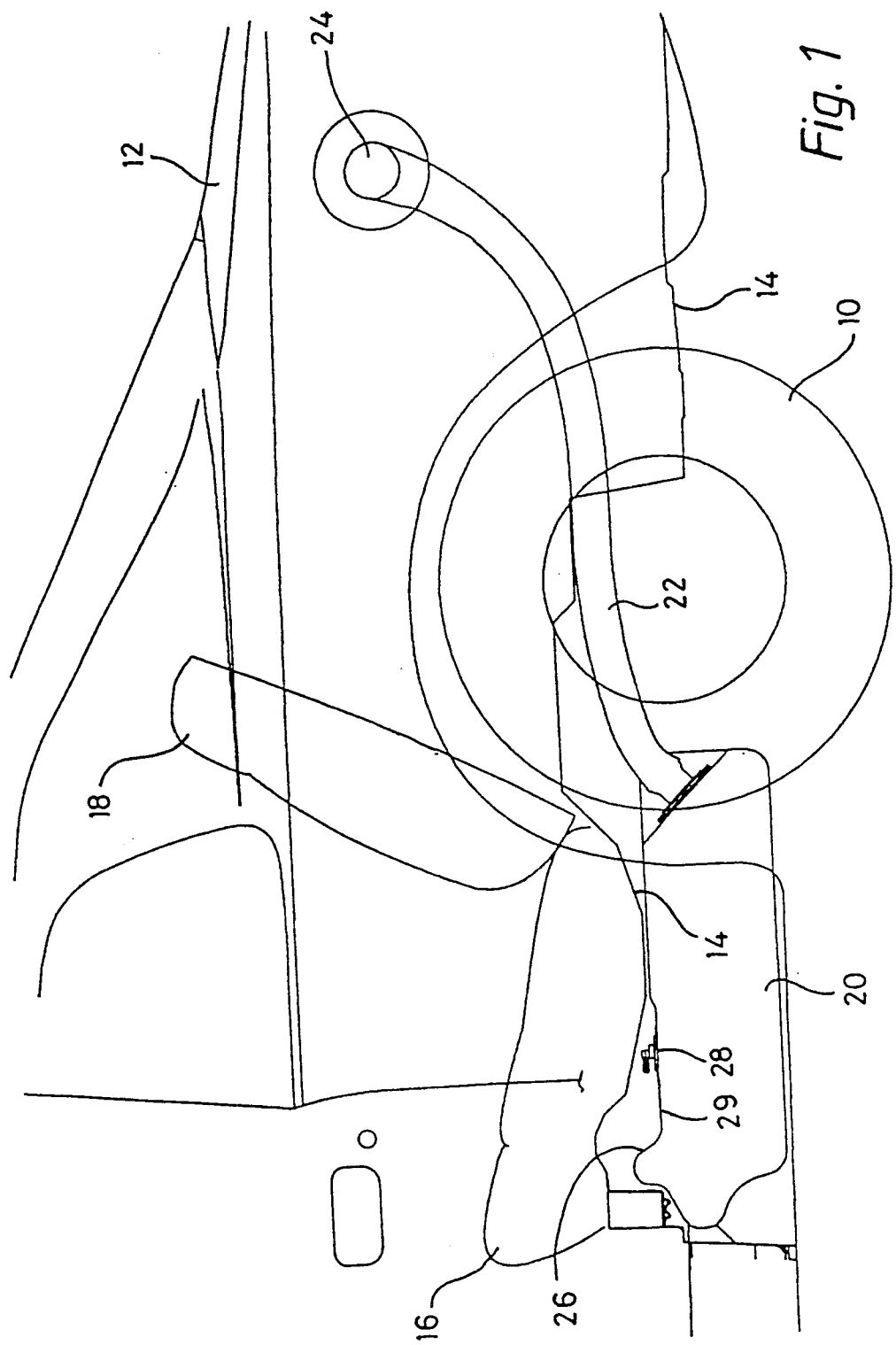
FIG. 1 is a side view of the rear part of the car incorporating a fuel tank with a closure component in accordance with the invention.

FIG. 1 shows a side view of the rear part of a car with a rear road wheel 10, a body side panel 12 and a rear floor pan 14. Forward of the rear wheel 10 is a seat 16 with a back rest 18, and located beneath the seat 16 and beneath the floor pan 14 is a fuel tank 20. The fuel tank is connected by means of a filler pipe 22 to a filler opening 24 in the body side panel 12.

The tank has a top face 26 in which a closure component 28 is mounted. The tank shown in the drawings is blow molded from a plastic material and will be held to the underside of the floor pan 14 by supporting straps (not shown) in a manner which is already known. The closure component 28 provides connections by which fuel feed and fuel return pipes can be connected to the tank and through which fuel can be supplied to and returned from the engine fuel system. The closure component is located in a dished area 29 of the top surface of the tank, and the external components which extend above the top surface of the tank are housed within a space between the top 26 of the tank and the underside of the floor pan 14.

Figure 2:
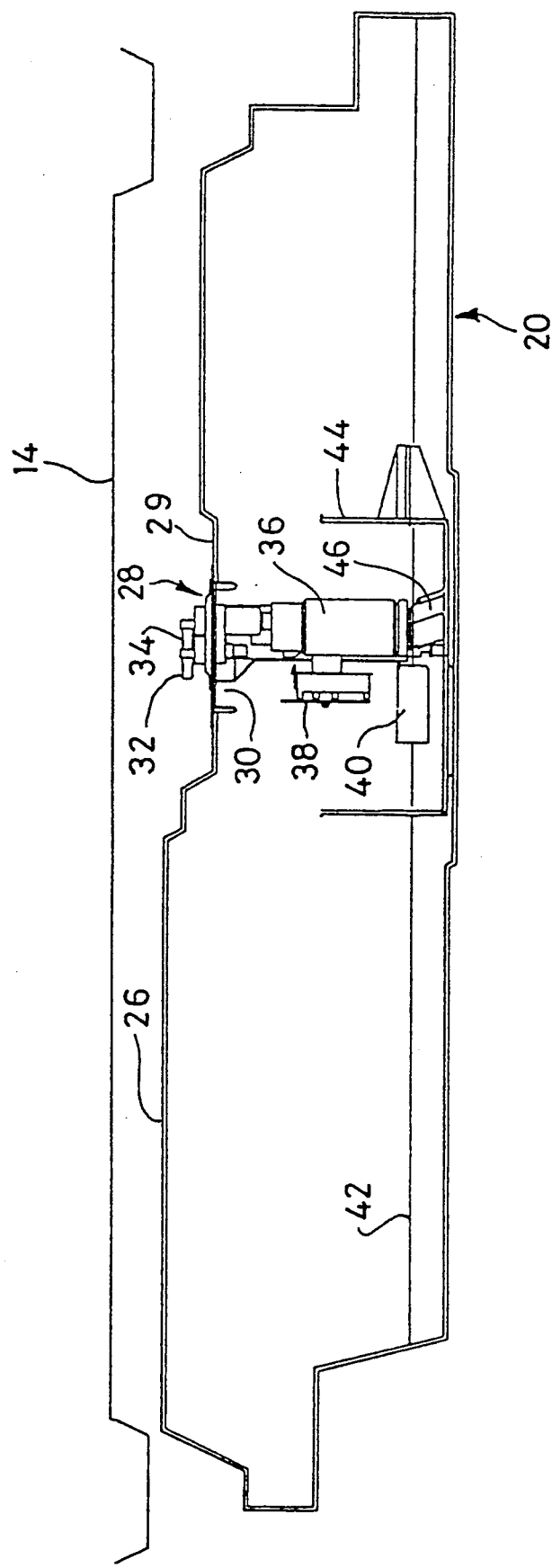
FIG. 2 is an enlarged transverse sectional view of the fuel tank shown in FIG. 1.

FIG. 2 shows the tank and closure component on an enlarged scale and in transverse cross section, i.e. the section is taken in a fore-aft Plane across the vehicle.

The tank 20 is a one-piece blow molding, with an opening at 30 for receiving a closure component 28. Externally of the tank, the closure component has two fuel pipe connections 32 and 34, and internally of the tank the closure component supports a bracket 71 to which a fuel pump 36 and a fuel level sensor mechanism 38 activated by a float 40 are secured. The fuel level within the tank is shown at 42, and a reservoir 44 surrounds the bottom end of the pump 36 to provide a volume of fuel into which a filter sock 46 can extend. In the views of both FIGS. 1 and 2, the fuel connections 32 and 34 are housed in a shallow recess area 29 between the top face 26 of the tank and the floor pan 14.

Figure 3:
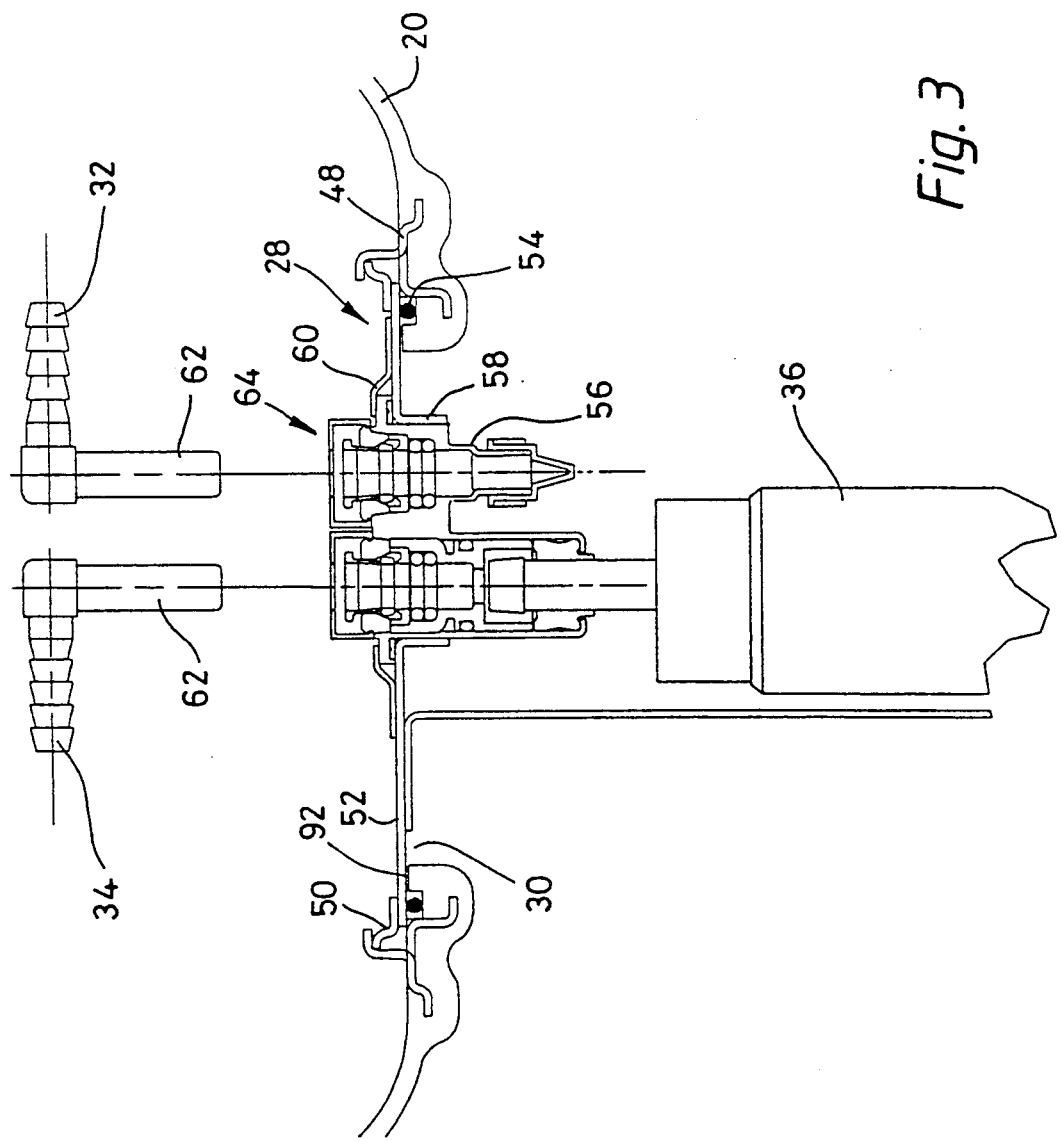
FIG. 3 is an enlarged sectional view of the fuel tank and the closure component shown in FIG. 2.

FIG. 3 is a view on an enlarged scale of the closure component 28. The part of the plastics fuel tank 20 which surrounds the opening 30 is illustrated in FIG. 3. It will be seen that a securing ring 48 is molded into the edge of the tank opening 30, and that a separate retaining ring 50 is used to clamp in place a metal plate 52 which forms part of the component 28. A seal ring 54 is compressed between the edge of the tank and the plate 52 when the retaining ring 50 is put into place. A plastic insert 56 is fitted into a socket formed by inturned flanges 58 on the metal plate 52 and held in place by a cover plate 60. The cover plate 60 is spot welded to the plate 52.

The fuel feed and return connections 32, 34 are in the form of right-angled pipe elbows each of which has a parallel sided stem 62 to fit into a connector body 64 which is included in the insert 56. The connector body 64 is shown on a larger scale in FIG. 4. This body has two pipe connectors which operate in the manner described in GB-PS 1,520,742 which is incorporated herein by reference. Each connector has a dust cap 66, an annular sleeve 68, a collet 70 and two 0-rings 72 and 74. The sleeves 68 are ultrasonically welded to the insert 56. All these components have a passage through them for receiving a stem 62 of one of the connectors 32, 34. The plastic insert 56 also has a passage for receiving the stem which extends down to a shoulder 76 in the insert.

Figure 4:
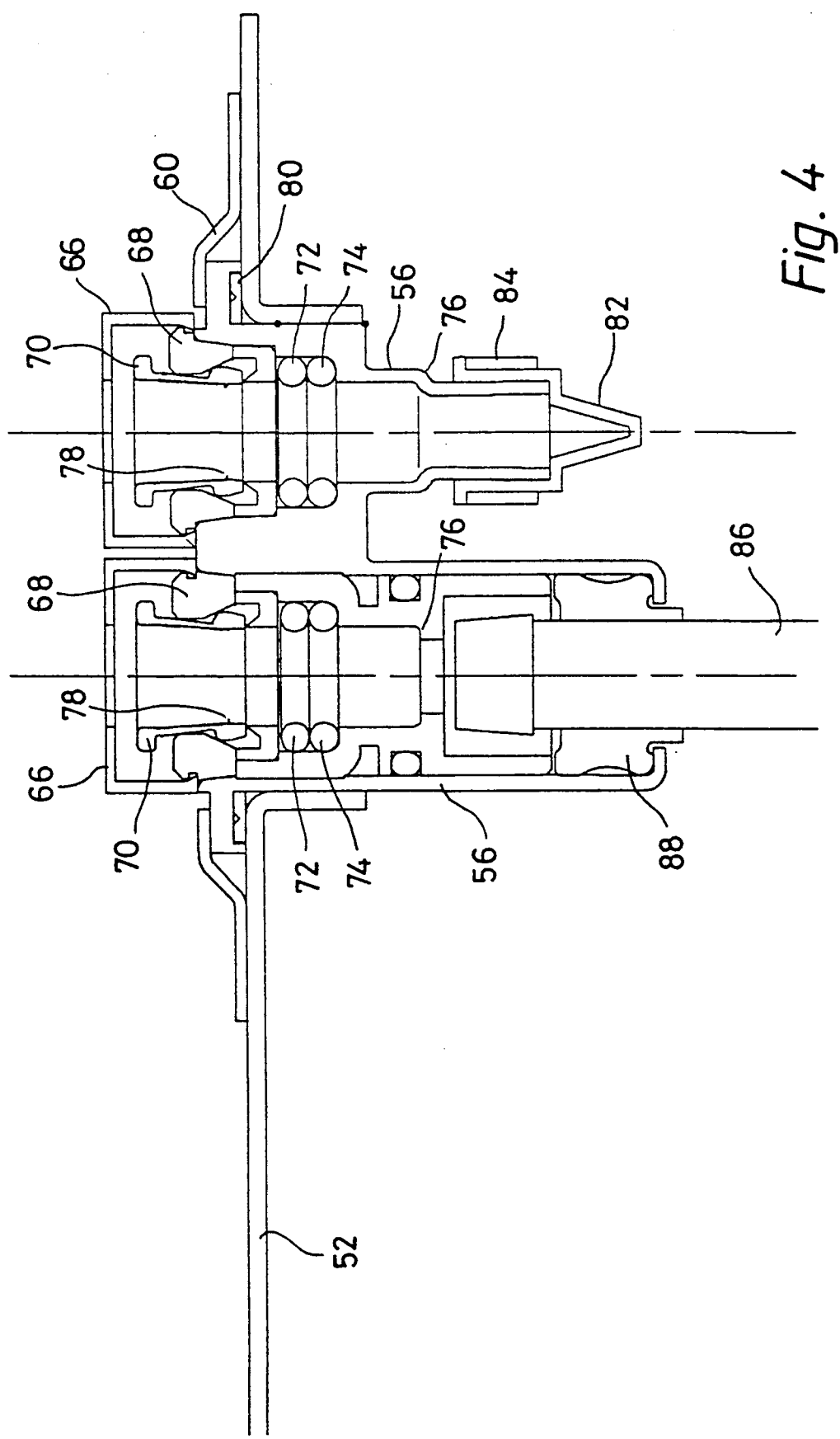
FIG. 4 is a still further enlarged sectional view of the closure component shown in FIG. 3.
Figure 5:
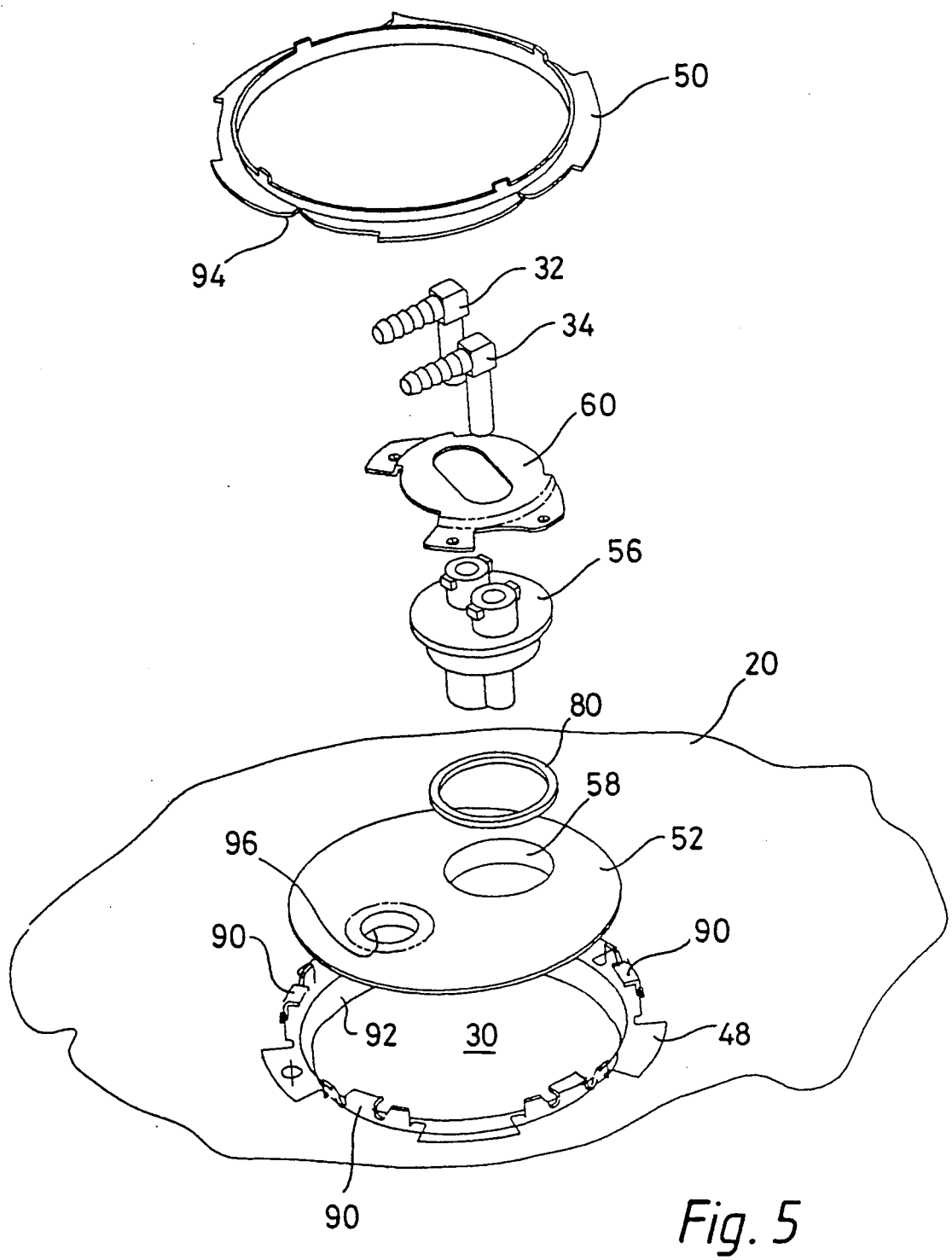
FIG. 5 is an exploded view of the closure component assembly.

When the stem is inserted, a fluid tight seal is formed between the outer wall of the stem and the O-rings 72, 74. The collet 70 has internally a sharp annular tooth or teeth 78 which makes contact with the wall of the stem. If an attempt is made to pull the stem out, then the collet 70 will also try to move in the outward direction because of the contact between the wall of the stem and the tooth 78. This movement will result in the lower walls of the collet 70 being cammed inwards by contact with the sleeve 68, so that the teeth 78 are pushed even further into the wall of the stem 62. The connectors can therefore not be accidentally pulled out from the passages. However, if it is desired to remove a connector, then a pair of opposite release tabs 63 on the cap 66 are pressed in, and these hold the collet 70 in a lowered position. One of these release tabs is shown in FIG. 4, but in fact the tabs will normally be oriented as shown in FIG. 5 and will not be visible in the views of FIGS. 3 and 4. These tabs then prevent the camming action taking place between the sleeve and the collet and allow the connector to be withdrawn. The connectors 32 and 34 remain free to rotate at all times and are thus able to absorb torsional forces.

A seal 80 is fitted between the aperture in the metal plate 52 and the insert 56.

In FIG. 4, the right hand connector socket is for the fuel return pipe, and the socket passage ends in a non-return check valve 82 of flexible construction with a slit in it which can be opened by flow in one direction but will not be opened by flow in the other direction. The check valve is held onto the Plastic insert by a retainer 84. A fuel pump outlet pipe 86 is connected by means of a seal member 88 to the bottom of the left hand connector socket, and this socket then receives the connector for the fuel feed pipe leading from the tank 20 to the engine. A check valve 67 is mounted in the fuel pump outlet 86 and is closed by a spring when the pump is not running, to prevent any escape of fuel from the tank, and to maintain the pressure of fuel in the fuel system.

The pump 36 and the level sensor mechanism 38, 40 are secured to a bracket 71 which is itself welded to the plate 52. The assembly of pump, sensor and fuel line connectors can be preassembled and then fitted to the tank as a single unit. The connection of the pump outlet 86 to the lower end of the connector body can be made by a simple push-in action.

FIG. 5 shows how the various components are assembled, with the securing ring 48 molded into the material of the tank top 20, by an insert molding process, to form an edge to the aperture 30. The securing ring 48 has upstanding, inwardly directed lugs 90, and the plate 52 sits on an internal lip 92 (see FIG. 3), with a seal 54 in place. The plate 52 is then held in place by the retaining ring 50 which has four cam forms around its edge so that the ring can be dropped into place on top of the plate and then rotated through the appropriate angles so that the cam forms 94 engage under the retaining lugs 90 to press the plate 52 against the seal 54.

In addition to the hole in the plate 52 for receiving the insert 56, there is another hole 96 through which electrical connections will be made to the sender unit 38, but these electrical connections form no part of the present invention.

To connect the fuel tank 20 to the engine of the vehicle, it is only necessary to push-fit the end of the two connectors 32, 34 into the sockets in the insert 56. Because there are no upwardly projecting parts of the closure component, the component is not vulnerable to damage prior to assembly.

The closure component as described here therefore eliminates the troublesome soldering or brazing previously used to attach fuel feed and return pipes to the top of the fuel tank.

I claim:
1. A blow-molded plastic fuel tank comprising:
walls defining an internal cavity for containing fuel, one said wall having a generally planar top face; said top face having a dish shaped area recessed from said top face and containing a closure means; said closure means to sealably engage a circular opening in said area, said closure means comprising a plate means having a circular aperture therethrough, and a connector body made from a molded plastic material;
said connector body being received in said aperture and communicating with said internal cavity, said connector body defining a first push-fit socket having a first mouth internally receiving a rotatable first fuel pipe and a second push-fit socket having a second mouth internally receiving a rotatable second fuel pipe, said recessed area having a depth exceeding the height of said first and second mouths, whereby said first and second mouths are located below said top face;

said plate having an outer surface and an inner surface and said first and second mouths are substantially flush with said outer surface;

a first passage means through said connector body communicating with said first push-fit socket, said first passage means having an inner end capable of communicating fuel from said internal cavity to said first fuel pipe;

a second passage means through said connector body communicating with said second socket, said second passage means having an inner end capable of communicating fuel from said second fuel pipe to said internal cavity;

a non-return valve attached to said inner end of said second passage means, said non-return valve preventing fuel from passing from said internal cavity to said second passage means;

an in-tank fuel pump and fuel level sensor means attached to and supported by said plate;

a check valve attached between said fuel pump means and said first inner end, said check valve means preventing the inadvertent release of fuel from said internal cavity;

a seal means between said plate means and said connector body to seal said fuel within said internal cavity;

a securing ring integrally molded within the periphery of said opening, said securing ring having upstanding lugs projecting outwardly from said tank;

a metal retaining ring engaging said lugs, said retaining ring comprising axially extending cam forms, said cam forms engage said lugs on said securing ring and securing said plate to said tank; and an O-ring seal between said connector body and said plate.

* * * * *